United States Patent [19]

Gasbarro

[11] 4,402,112
[45] Sep. 6, 1983

[54] AUTOMATIC POULTRY DEBONING APPARATUS

[76] Inventor: Geno N. Gasbarro, 1305 Noe-Bixby Rd., Columbus, Ohio 43227

[21] Appl. No.: 250,257

[22] Filed: Apr. 2, 1981

[51] Int. Cl.³ ............................................... A22C 21/00
[52] U.S. Cl. ......................................... 17/11; 17/1 G; 17/46
[58] Field of Search ....................... 17/11, 1 G, 46, 51

[56] References Cited

U.S. PATENT DOCUMENTS

| | | | |
|---|---|---|---|
| 2,851,362 | 9/1958 | Goldberg | 17/46 X |
| 2,897,536 | 8/1959 | Bergstrom et al. | 17/1 G |
| 3,089,775 | 5/1963 | Lindall | 17/1 G X |
| 3,570,050 | 3/1971 | Draper et al. | 17/1 G X |
| 4,020,528 | 5/1977 | Lindbladh | 17/51 X |
| 4,217,679 | 8/1980 | Gordon | 17/1 G X |

*Primary Examiner*—William G. Abercrombie

*Attorney, Agent, or Firm*—Francis T. Kremblas, Jr.

[57] ABSTRACT

A method and apparatus for separation of the meat from the bone portion of poultry leg and thigh portions using an array of high pressure fluid streams disposed along the path of travel of a conveying means. The fluid streams are disposed in a manner to impinge upon the point of junction of the meat to the bone portion with the poultry leg or thigh portion disposed in a fixed position on the conveying means with the bone portion disposed substantially parallel to the path of travel. As the leg or thigh portion is advanced, the leading end is engaged by the plurality of fluid streams to progressively loosen and separate the meat from the bone as the portion advances along the conveyor. As the meat is separated from the trailing end portion, the bone advances to a separate compartment from the meat removed therefrom.

4 Claims, 7 Drawing Figures

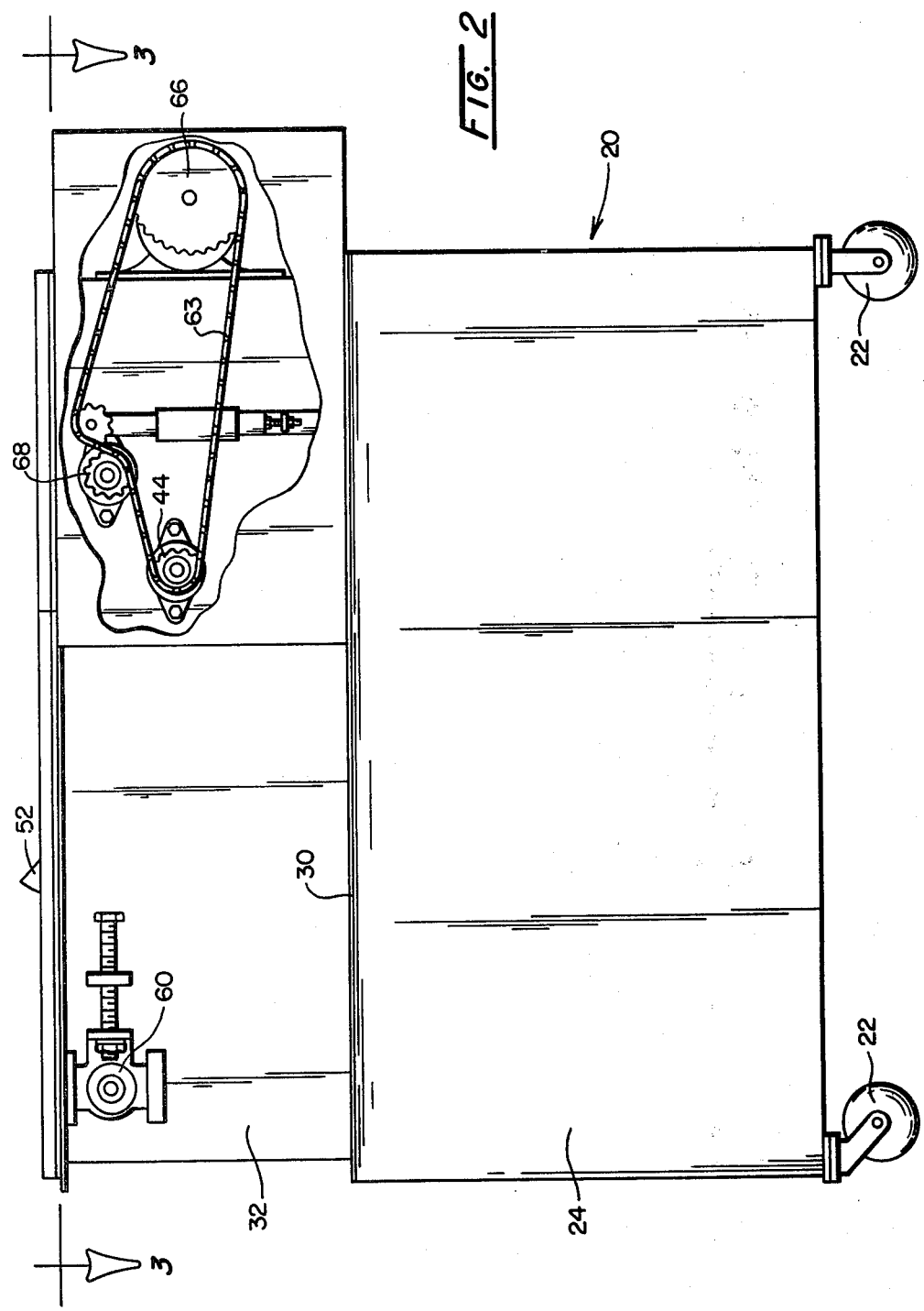

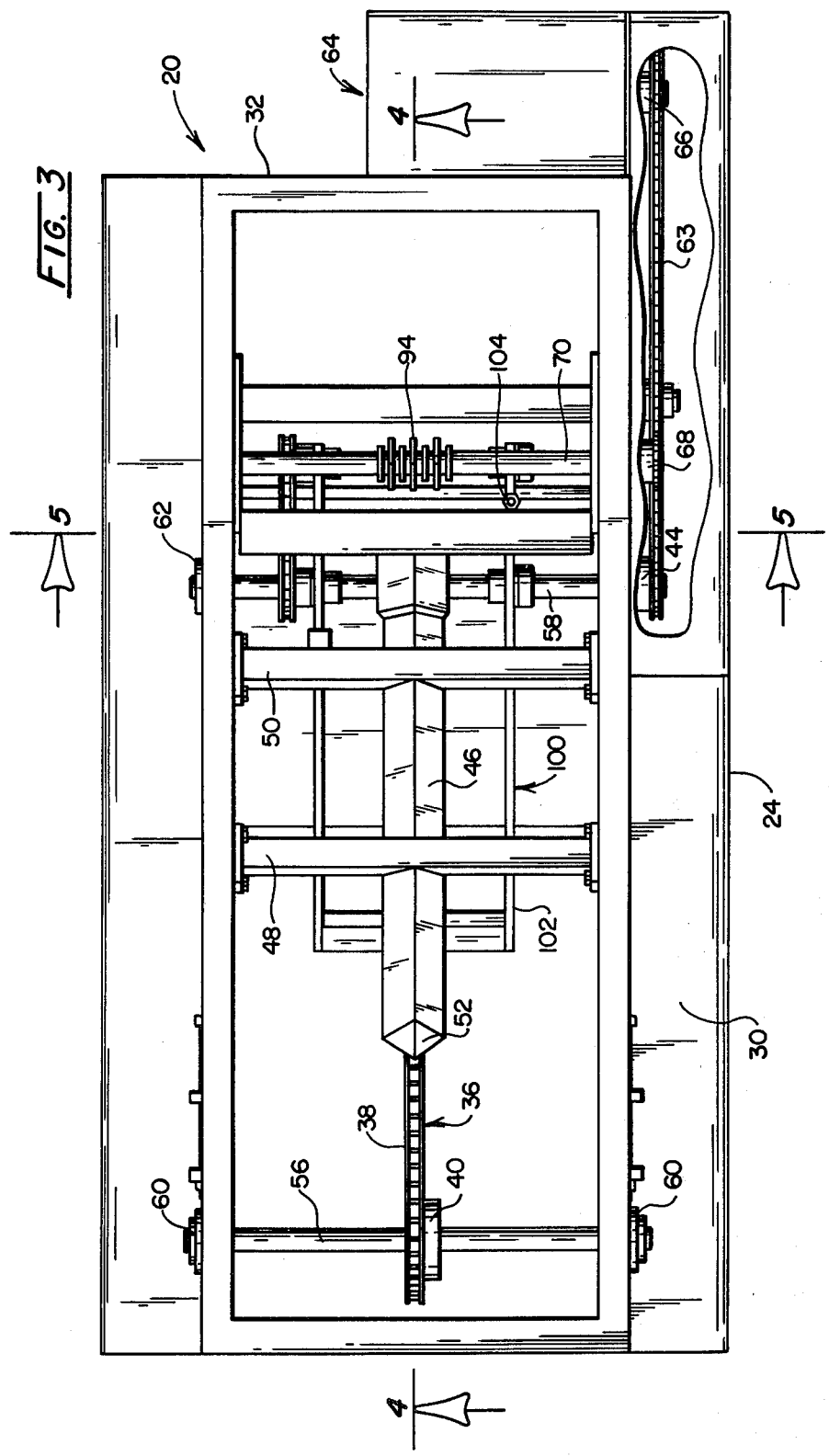

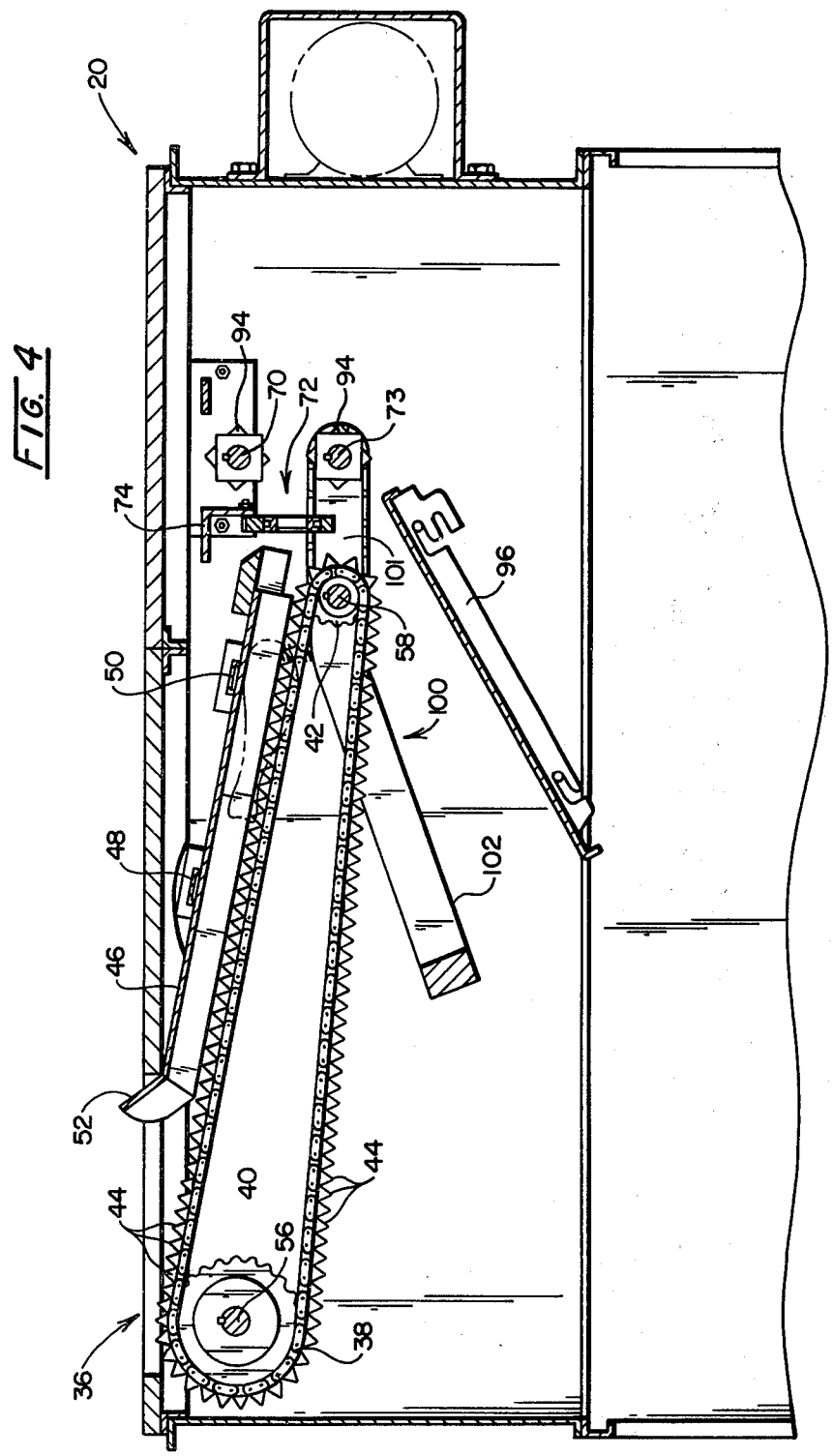

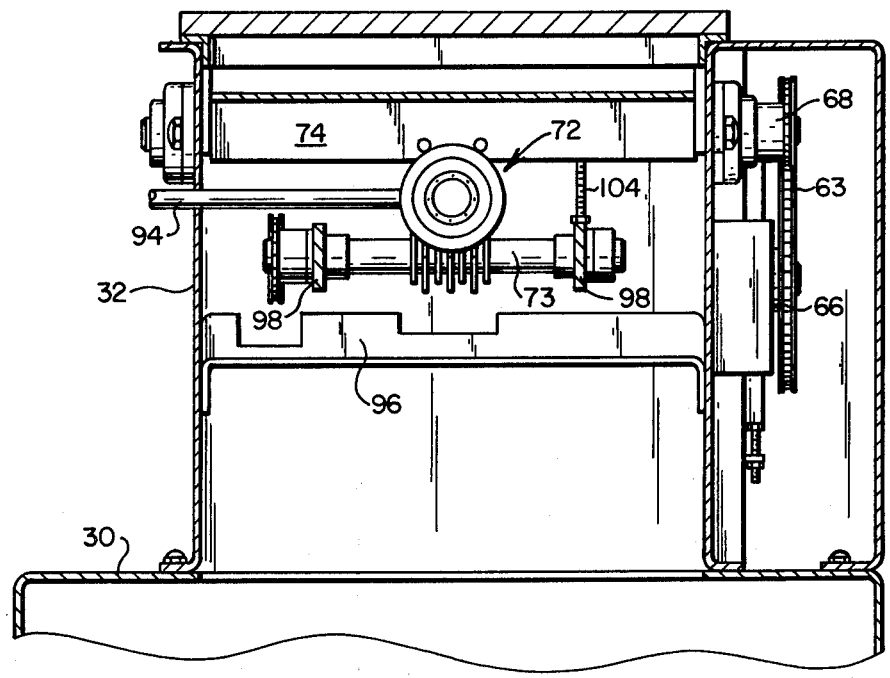
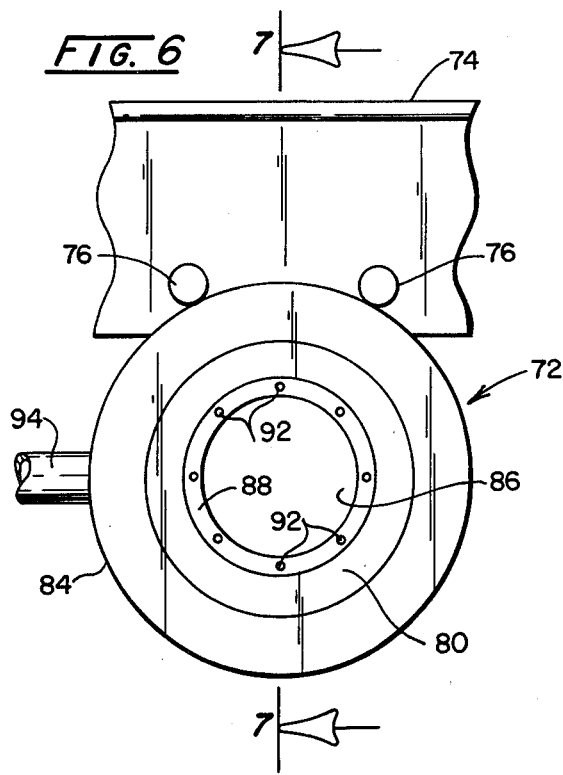
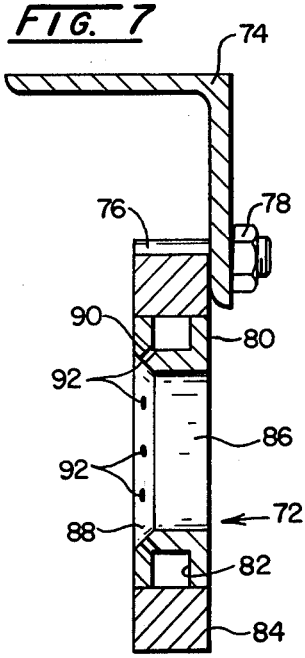

AUTOMATIC POULTRY DEBONING APPARATUS

BACKGROUND

Prior to the present invention, and in all commercial applications presently engaged in providing deboned poultry meat, the only method employed was the manual removal of the leg and thigh meat from the bone.

For many years, the manual deboning process has been the only means for supplying a rapidly growing commercial demand for deboned poultry meat. This has been true for both the "white meat" from the breast or wings as well as for the "dark meat" from the leg or thigh portions. Usually the white and dark portions are sold separately because of the taste preference of consumers.

However, in spite of the many years over which a high demand for deboned poultry meat has been recognized, a satisfactory automated method and apparatus has not been developed which combines the requirements of efficiency, sanitation, speed, and simplicity of manufacture to any significant degree necessary to replace the manual process.

In the face of the relatively high cost and inefficiency of the manual process, the inherent problems of automating this deboning process have not been solved prior to the present invention.

SUMMARY OF INVENTION

The present invention generally relates to a poultry deboning method and apparatus and particularly to a novel method and apparatus for automatically deboning the leg and/or thigh portions, herein after defined as the dark meat portion of a poultry product.

The present invention utilizes a unique array of pressurized fluid streams, preferably, water or a water solution of flavorizers, which are directed upon the dark meat portions in a manner to cause the separation of the meat from the bone. Conveying means mounted in a suitable housing carry these dark meat portions in a fixed position between a loading station and a meat separation station where the portions are advanced through the pressurized fluid streams.

As the meat portion is advanced toward the point of impingment by the fluid streams, the streams which are directed at an acute angle relative to the path of travel strike the meat at approximately the point of junction with the bone to forcefully cause the meat to separate from the bone beginning at the leading end thereof which is first exposed to the fluid streams. As the portion advances at a predetermined rate, the meat portion is effectively stripped away from the bone to fall into a separate compartment for collection. The bone portion continues on to a different area for collection.

The fluid streams are arranged in a substantially coplanar relationship to form a radial array directed around the circumference of the points where the meat portion and bone portion meet.

OBJECTS

It is a primary object of the present invention to provide a method and an apparatus which debones poultry dark meat portion in an automated manner which eliminates the manual process heretofore employed.

It is another object of the present invention to provide a method and apparatus which utilizes a plurality of streams of pressurized fluid to separate and strip the meat portion from the bone in a manner which facilitates separate collection of the meat.

It is another object of the present invention to provide a method and apparatus of the type described wherein a truly significant advance in production speed is possible yet maintaining the high degree of sanitation required by the food processing industry.

It is a further object of the present invention to provide an apparatus wherein a relatively simple and economic manufacture is possible to provide a compact and efficient device having the capacity of several manual workers.

Further objects and advantages of the present invention will be apparent from the following description, reference being had to the accompanying drawings wherein a preferred form of embodiment of the invention is clearly shown.

IN THE DRAWINGS

FIG. 2 is a side elevational view of the apparatus shown in FIG. 1 with a partial section taken along the centerline of the apparatus shown in FIG. 1;

FIG. 3 is a top plan view of the apparatus shown in FIG. 1 in section, the section taken along line 3—3 in FIG. 2;

FIG. 4 is a side elevational view in section of the apparatus of the preceding Figures, the section being taken along line 4—4 in FIG. 3;

FIG. 5 is an end sectional view of the apparatus of the preceding Figures, the section being taken along line 5—5 of FIG. 3;

FIG. 6 is a partial end elevational view of a portion of the apparatus shown in the preceding Figures, illustrating the nozzle means employed in the present invention; and FIG. 7 is a partial side elevational view in section of the nozzle portion shown in FIG. 6, the section being taken along line 7—7 in FIG. 6.

DETAILED DESCRIPTION

Figure 1:
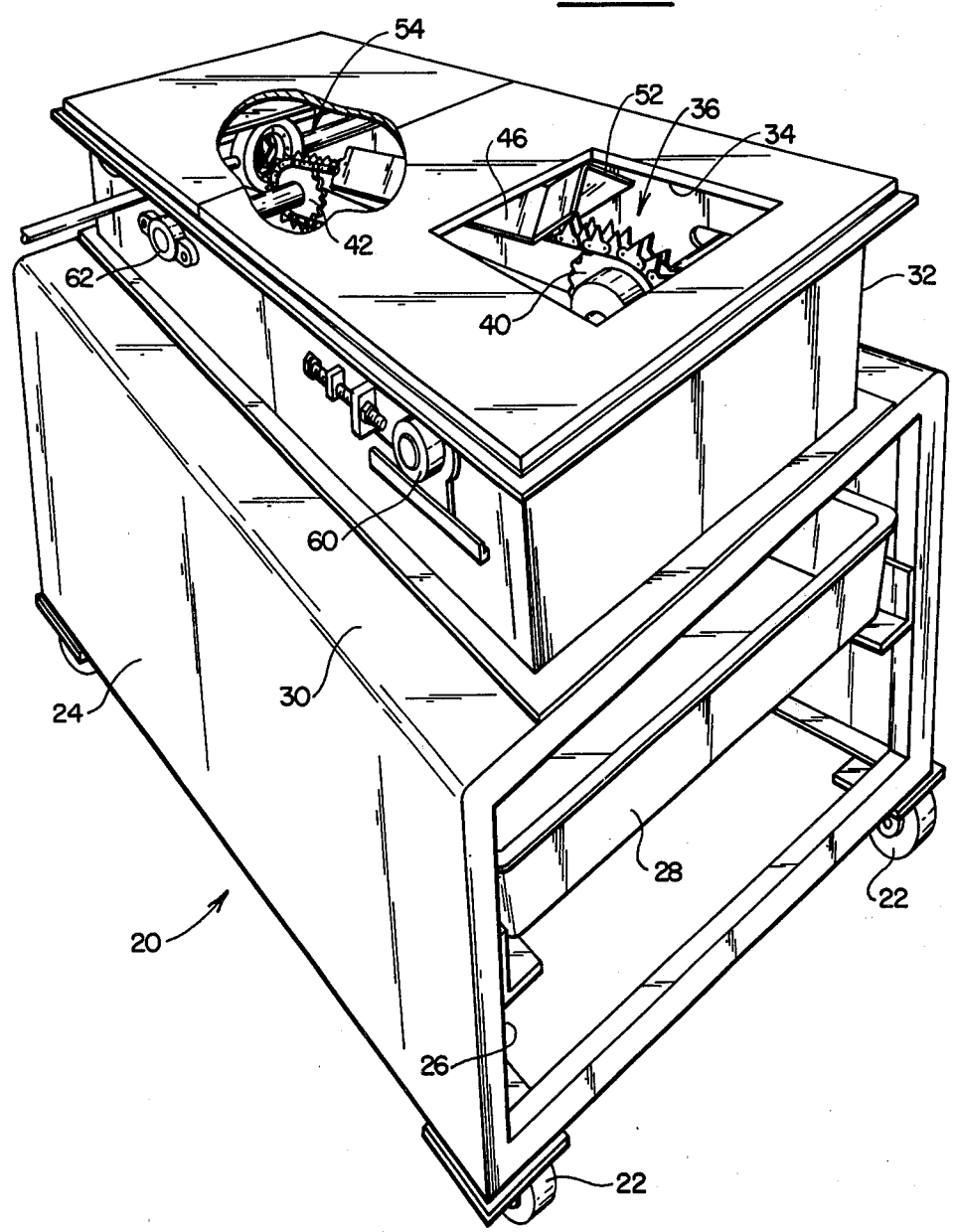
FIG. 1 is a perspective view of an apparatus for deboning poultry dark meat portions constructed in accordance with the present invention.

A deboning apparatus particularly adapted for "dark meat" portions of a poultry carcass constructed in accordance with the present invention is illustrated in FIG. 1 and includes a base means indicated generally at 20.

Base means 20 preferably is provided with caster type wheels 22 for easy portability and has side walls 24 and an open front and rear portions such as 26. A collecting tray 28 is shown slideably mounted within the confines of base means 20 for the collection of meat product. However, a continuous conveyor means may also be employed as well as a base means interconnected thereto as desired without departing from the spirit of the present invention.

Side walls 26 may be formed of sheet metal and include a flange portion 30 which provides support for a protective frame means 32 which surrounds the deboning mechanism mounted therein.

Frame means 32 may be fixed to flange portion 30 in any suitable conventional manner and includes a feed opening 34 which provides access to the loading station of a conveyor means 36 for the poultry portions to be processed.

Now referring specifically to FIGS. 3, 4 and 5, conveying means 36 includes a continuous chain 38 mounted to a pair of sprokets 40 and 42. Chain 38 is provided with means to aid in gripping the poultry portions such as triangularly shaped spikes 44 fashioned as part of chain links forming the chain 38.

A triangular shaped shield 46 is mounted over the upper path of travel of chain 38 and is supported in frame means 32 by a pair of braces 48 and 50 fixed to shield 46 and to the side walls of frames means 32.

The front end of shield 46 includes an upwardly turned chute or entrance portion 52 which functions to aid in guiding the leg or thigh portion into engagement with the spikes 44 on the chain 38.

Shield 48 extends rearwardly and terminates just prior to reaching the deboning station or area which is located a predetermined distance in front of a nozzle means indicated generally at 54.

Sprockets 40 and 42 are mounted on shafts 56 and 58 respectively which in turn are journaled in a conventional manner to the side walls of frame means 32 such as at 60 and 62. As best seen in FIGS. 2 and 3, a conventional electric motor, indicated generally at 64, is provided and includes a driven shaft operatively connected to sprocket 66. In turn, a chain belt 63 connects sprocket 66 with sprocket 44 which is mounted on shaft 58 to drive sprocket 42 and conveyor means 36. Belt 63 is also operatively connected to a sprocket 68 which is connected to a journaled shaft 70 as will be described in detail later herein. Other conventional variations may be employed to provide the driving force to all rotatably mounted shafts without departing from the spirit of the present invention.

As best seen in FIGS. 5-7, a fluid nozzle means indicated generally at 72 is conventionally attached to an overhead bracket or support member 74 via a pair of studs 76 extended through a pair of holes provided in brace 74 and fixed thereto by threaded nuts 78. Studs 76 are welded to the outer ring portion of nozzle means 72 and are provided with a threaded end portion which are adapted to receive nuts 78. Bracket 74 may be fixed to the side walls of frame means 32 by any conventional means such as threaded fasteners or welding for example.

Nozzle means 72 comprises a generally ring-shaped inner head portion 80 provided with an angular passage in the form of a groove 82 which extends around the circumference of head portion 80. An outer ring shaped closure member 84 is welded in sealed relationship to head portion 80 to close passage 82.

A central opening 86 provided in head portion 80 is designed to permit passage of the bone portion of the poultry section delivered to the deboning station by chain 36.

The forward face of inner head portion 80 includes a beveled area 88 circumferentially located adjacent opening 86. A plurality of small passages 90 are circumferentially spaced along area 88 and terminate in outlet ports 92. Drilled passages 90 communicate high pressure fluid supplied through an inlet line 94 to annular passage 82 to each port 92.

Ports 92 preferably are of relatively small size, 0.015 inch, for example which provide a relatively fine stream of fluid.

Passages 90 and ports 92 are arranged along the beveled area 88 at approximately a 45 degree angle to direct the fluid streams from ports 92 to a predetermined area along the path of conveyor chain 36 designed to impinge upon the approximate intersection of the meat portion and the bone portion of a poultry dark meat section advancing along conveyor chain 36.

The fluid employed under pressure is preferably conventional water and, if desired, may possess an amount of a dissolved flavoring agent, such as salt or the like. Pressures in the range of 1500 to 3000 psi have been found to work well to separate the meat portion from the bone. For larger sized poultry, such as turkey, for example, higher pressures may be useful to employ.

A dark meat poultry section positioned with the bone portion parallel to the path of travel is firmly fixed on chain 36 within the confines of shield 46. As best seen in FIG. 4, just prior to the termination of chain 36 as it passes around sprocket 42, shield 46 terminates to expose the forward end of the poultry section to the streams of fluid from outlet ports 92.

As the forwardmost portion is exposed to the fluid streams, the meat portion is forced away from the bone by the force of the plurality of streams of fluid directed at closely adjacent areas around the circumference of the joinder of meat and bone.

As the poultry section is advanced at a predetermined rate, the points of impingement of the sprays is effectively advanced along the length of the bone. The combined effect of the force of the plurality of fluid streams and the advancement of the poultry section, effectively strips the meat portion from the bone.

The front portion of the bone from which the meat has been separated continues to advance through opening 86 and into engagement with a pair of spaced gripping members 94. Members 94 are provided with a plurality of tooth-like members and upon rotation they firmly engage the bone section and pull the bone completely through opening 86 in nozzle means 72.

The members 94 are spaced from the end of effective travel of the poultry portion on conveyor chain 36 to assure continuity of control of the movement of the bone section along the desired path of travel.

As the bone portion passes through opening 86, the meat portion is fully stripped away via the action of the plurality of fluid streams and has fallen to an optional divider 96 which directs the separated meat to a collection area disposed below. The bone portion continues beyond members 94 until it falls into a separate collecting area toward the rear of housing 20. Optionally, the housing and base means could be designed having vertical dividers or the like to define separate collecting areas for the meat and bone portions.

Gripping members 94 are mounted on a pair of rotatable shafts 70 and 73. Shaft 70 is driven via chain belt 66 and sprocket 68 connected to the outer portion of shaft 70 which is journaled through the side walls of housing 32 in a conventional manner.

Shaft 73 is journaled to bearing members 98 which are mounted in a counterbalance member 100 which in turn is pivotally mounted to shaft 58. Counterbalance member 100 is provided with a relatively heavier forwardly extending portion 102 and compared to the rearwardly extending portion 101, which tends to pivot the rear portion carrying shaft 73 upwardly.

A stop means, in the form of a threaded member 104 may be threadably received by member 100 and extends upwardly to engage the top wall of housing 32 to limit the upward travel of shaft 73.

Threadably adjusting the height of member 104 adjusts the minimum spacing between gripping members 94.

A spring 105 is mounted between counterbalance member 100 a portion of support 50 which tends to resist the upward movement of front portion 102 and hence the downward movement of shaft 73 carrying members 94.

Therefore this construction permits shaft 73 to be resiliently mounted relative to a downward force which would be applied when a bone portion becomes engaged between gripping members 94. The relative weight of forward portion 102 and the spring force applied by spring 105 may be adjusted to provide a suitable range to assure that a bone portion will not become entrapped to jam gripping members 94 and also provides a flexibility in handling bone portions of a given size range conveniently by providing for automatic adjustment of the spacing between gripping members 94 during operation.

A sprocket 106 mounted on driven shaft 58 is connected to a sprocket 108 on shaft 73 via chain belt 110 to rotate shaft 73 in concert with shaft 70 and shaft 58.

In operation, a user inserts either a connected leg and thigh portion or a separate leg or thigh portion through opening 34 and onto conveyor chain 36. Whether separate or connected, the poultry portion is arranged with the long bone portion parallel to the direction of travel of the chain 36. As the portion is fed into the shield 46, which aids and guides the loading process, the poultry portion is fixed in position through the combination of the sharp spikes 44 and the proximity of the remainder of the length of shield 46. After loading the first piece, the loading step is continuously repeated.

As each poultry portion advances to the deboning station in the area of convergence of the fluid streams from nozzle means 72, the fluid streams strike the forwardmost portion emerging from the terminal end of shield 46. The pressure of the streams impinging upon or near the points of junction between meat and bone loosens and strips away the meat from the bone.

As the poultry portion is advanced through this area of impingment formed by the streams of fluid, the meat portion is progressively stripped away from the bone and eventually falls free thereof to the collection area below.

The forward portion of the bone continues to advance during this stripping process through the central opening of the nozzle means 72 and is engaged by rotating gripping members 94.

The position of gripping members 74 is designed to assure that the rearward portion of the poultry portion being processed is still held by the action of chain 36 and sheild 46 until the forward bone portion is firmly gripped by member 94. This assures that there is a continuity of control of the position and movement of the poultry portion at all times during the actual impingment of that portion by the fluid spray.

As control of the movement of the stripped bone portion is assumed by gripping members 94, the bone portion is advanced until it passes through members 94 to fall into a separate collection area.

In view of the foregoing description, it should be readily understood that the method and apparatus of the present invention provides an efficient, santitary and convenient automatic deboning process. The increase in production over manual processing is very substantial to provide drammatic labor saving. Further, the risk of injury to users is drammatically reduced compared to the manual process using conventional knife blades to strip away the meat.

What is claimed is:

1. In an automated poultry deboning apparatus for separating the meat from the bone of poultry dark meat portions, the combination of, a housing means; a conveying means mounted in said housing means including means to engage and transport the poultry portion along a predetermined path of travel with the bone portion disposed longitudinally to the direction of travel along said conveying means; nozzle means supported in said housing and comprising a generally ring-shaped member provided with a central opening and a plurality of outlet ports spaced around the circumference of said opening and disposed to direct a fluid stream from each outlet port at an acute angle with respect to the longitudinal disposition of the bone portion of each poultry portion advanced along said conveying means, said nozzle means including an annular passage communicating with each of said outlet ports, said streams of of fluid from said outlet ports directed to impinge at closely adjacent points along the intersection of the meat and bone of said poultry portions beginning with the leading end of the bone first exposed to said streams as it is advanced along said conveying means to cause separation of the poultry meat from the adjacent bone sections of said portions, said bone aligned to pass through said central opening of said nozzle means; a source of pressurized fluid operatively connected to said annular passage; power means operatively connected to said conveying means; and a first and second compartment means disposed below said nozzle means for separate collection of the poultry meat and the bone.

2. The apparatus defined in claim 1 wherein said conveying means includes an endless chain having a plurality of spaced outwardly extending gripping members for engaging said poultry portions and including an overhead shield member disposed along a predetermined portion of said conveying means between a loading station for each poultry portion and a deboning station defined at the point of travel wherein the poultry portions engage said fluid streams.

3. The apparatus defined in claim 1 including a pair of vertically spaced bone engaging members rotatably mounted in said housing and disposed adjacent to and aligned with said central opening of said nozzle means on the opposing side thereof relative to the impingement of said fluid streams on said poultry portions, for engaging the bone portion passing through said central opening in cooperating relationship with said conveying means to maintain control of the movement of said poultry portions during said meat separation process.

4. The apparatus defined in claim 3 wherein at least one of said vertically spaced bone engaging members is resiliently mounted for controlled vertical movement away from the other of said bone engaging members.

* * * * *